J. V. POTTER.
INDICATOR.
APPLICATION FILED MAR. 13, 1915.

1,167,657.

Patented Jan. 11, 1916.

Joseph V. Potter, Inventor

Witnesses
F. B. Wooden.
Einar Larson

By May A. Schmidt
Attorney

UNITED STATES PATENT OFFICE.

JOSEPH V. POTTER, OF LOUISVILLE, KENTUCKY.

INDICATOR.

1,167,657.   Specification of Letters Patent.   Patented Jan. 11, 1916.

Application filed March 19, 1915.   Serial No. 15,564.

*To all whom it may concern:*

Be it known that I, JOSEPH V. POTTER, a citizen of the United States, residing at Louisville, in the county of Jefferson and State of Kentucky, have invented certain new and useful Improvements in Indicators, of which the following is a specification.

This invention relates to devices used in connection with motor vehicles for preventing rear or side collisions, an indicator being provided which signals a stop and also the direction in which a turn is to be made.

The invention has for its object to provide a novel and improved signal or indicating device of the kind stated which can be readily controlled by the driver, and which operates by day or by night.

With the herein stated object in view, the invention consists in a combination and arrangement of parts to be hereinafter described and claimed, reference being had to the accompanying drawing in which—

Figure 1:
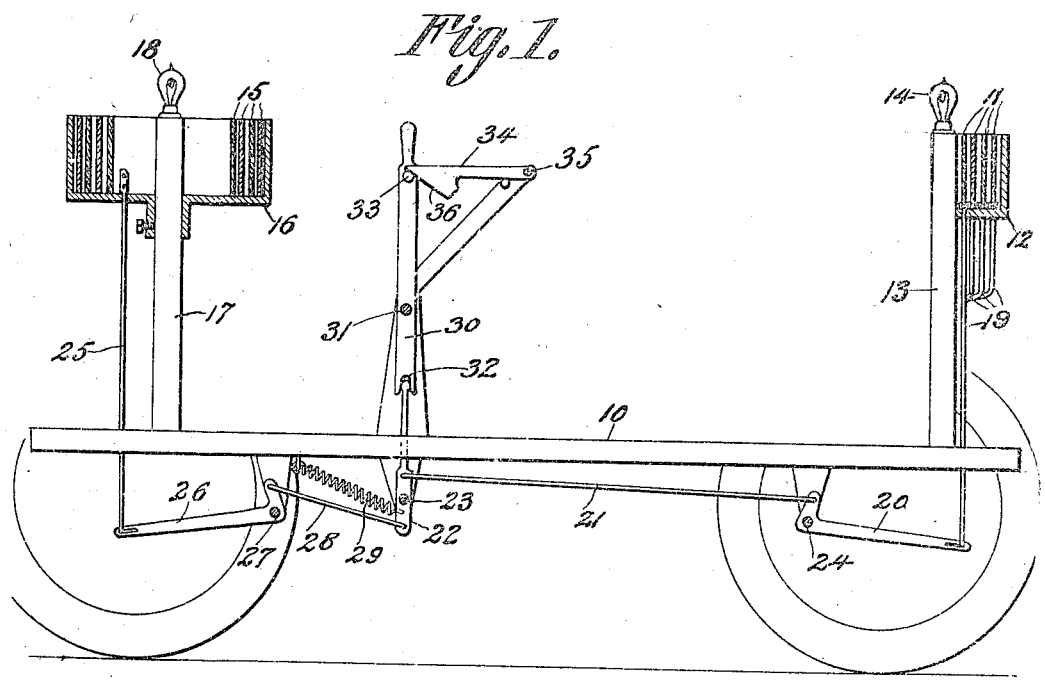
Figure 2:
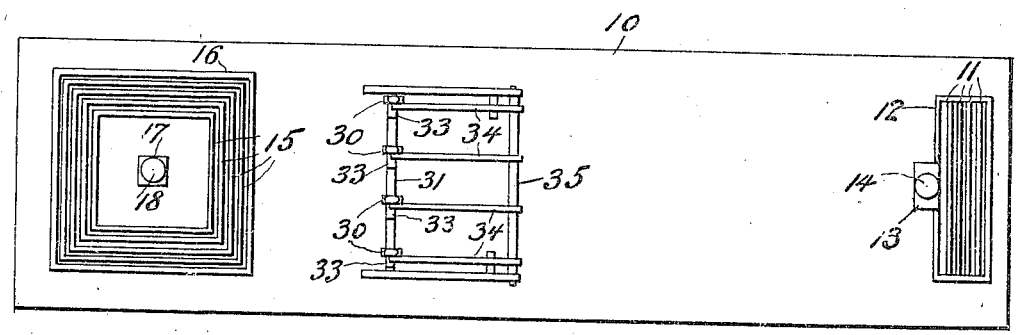

Figure 1 is a side elevation of the device, partly in section, and Fig. 2 is a plan view thereof.

Referring specifically to the drawing, 10 denotes the platform of a motor car equipped with the signal device which is the subject-matter of the present invention. The structure of the car is immaterial to the invention and need, therefore, not be described or illustrated. The rear end of the car carries a signal device to indicate to all vehicles in the rear a stop, or the direction in which the car will turn. The front end of the car also carries a signal device to indicate to persons in front of the car or to either side of the car, in which direction the car will turn, or whether a stop is to be made, and also to show the driver whether the rear signal has been properly set.

The rear signal comprises a series of sign plates 11 mounted one in front of the other in a housing 12 which is open at the top so that a selected plate may be elevated into display position. The housing 12 is mounted on a standard or other suitable support 13 secured to the platform 10 or any other convenient part of the car, at the rear thereof, and the housing is so located that an unobstructed view of the plates may be had when they are elevated out of the housing into display position, said plates facing rearward so as to be visible to the drivers of all vehicles behind the car. At the top of the support 13, above the level of the housing 12, is mounted a lamp 14 which may be an ordinary incandescent electric or other lamp. The lamp is so positioned that it is behind a plate when the same is elevated to display position. The plates are transparent or otherwise constructed so that the inscription thereon is visible at night when illuminated by the lamp. The device is therefore a day as well as a night signal.

The front signal comprises a series of signs 15, each being composed of a front plate, a rear plate and side plates. These plates are connected to form a square, and each plate is inscribed, the inscription being the same on each plate. Of course, the inscriptions on the plates of the respective signs differ: One sign contains the inscription " Stop "; another, the inscription " Right "; another is inscribed " Left," and another has the inscription " Forward." The sign plates 11 are similarly inscribed, and a connection is provided between the said plates and corresponding ones of the signs 15, so that when the " stop " sign plate 11 is elevated to display position, the " stop " sign 15 is simultaneously elevated to display position. The other sign plates and signs are similarly connected to operate together.

The signs 15 are dimensioned so that they may be nested, one within the other, and they are mounted in a housing 16 carried by a standard or other suitable support 17 secured to the platform 10, or any other convenient part of the car, at the front thereof, the housing being so located that an unobstructed view of the signs may be had when they are elevated into display position. The housing is open at the top so that the signs may be elevated thereabove. Each sign, as already described, has four faces so that the inscriptions may be visible from both sides of the car and also from the front. The rear faces of the signs are for the purpose of showing the driver of the car whether the signals have been properly set, the signs being located in front of the driver so that he may observe the rear faces thereof. The signs 15 are also adapted to be illuminated so that they may be visible at night, a lamp 18 being provided for this purpose. The lamp may be an ordinary incandescent electric lamp, and it is mounted at the top of the support 17, above the level of the housing 16, so that it shines through the signs when they are elevated to display position. The lamp is located centrally with respect to the innermost one of the signs, and each sign is therefore illuminated when it is elevated, the lamp illuminating all four faces of the elevated sign as it is on the inside thereof.

The following means are provided for operating the signal devices: To each sign plate 11 is connected a depending rod 19 connected at its lower end to one arm of a bell crank lever 20 having its other arm connected by a rod 21 to a lever 22 fulcrumed on a shaft 23, the bell crank lever being fulcrumed on a shaft 24. A rod 19, bell crank lever 20, lever 22 and connection 21 between the latter and the bell crank lever are provided for each sign plate. To each sign 15 is connected a depending rod 25 connected at its lower end to a bell crank lever 26 fulcrumed on a shaft 27, and having a connection 28 with the lever 22 of the corresponding sign plate 11. Thus, when the lever 22 is rocked the sign plate 11 and the corresponding sign 15 which is connected thereto are simultaneously elevated to display position. The connections between the lever 22 and the bell crank levers 20 and 26 are on opposite sides of the fulcrum 23 of the former to obtain the proper movement of the parts. The housings inclosing the sign plates and the signs have bottom openings through which the rods connected to said sign plates and signs pass. The shafts of the bell crank levers 20 and 26 and the lever 22 are suitably supported by the platform 10 or the frame of the car. The lever 22 is provided with a spring 29 for restoring the parts to normal position. The herein described operating devices for the respective sets of front and rear signals are all independent of each other.

Each lever 22 has an actuating hand lever 30 fulcrumed intermediate its ends on a shaft 31. The lower end of the lever 30 is forked, as indicated at 32, to straddle the upper end of the lever 22, whereby an operative connection between the two levers is had. At the upper end of the lever 30 is a hand grip, and adjacent to the latter, the lever has an outstanding side pin 33 designed to be engaged by the latch hook 34 fast on a rock shaft 35. An actuating hand lever and latch as hereinbefore described are provided for each lever 22, these being all independent except that the several latch hooks are all fast on a single shaft. The bill of the latch hook has an incline 36 which, when the pin 33 rides along the same, causes the latch hook to rise, and as all the latch hooks are fast on the shaft 35, they are lifted. Hence, if one of the hand levers has been swung to elevate one set of signal devices and locked, and it is desired to elevate another set of signal devices into display position, the displaying set is first dropped before the other set is elevated. As the hand lever of the selected set of signals is swung over to elevate the same, its side pin 33 engages the incline of its latch hook, and swings the latter to rock the shaft 35 to disengage the latch hook of the hand lever which is connected to the displaying set of signals, whereupon the latter drop out of view and the selected set rises to display position.

The preferred embodiment of the invention has been illustrated and described, but it will be obvious that various changes and modifications may be made without a departure from the spirit and scope of the invention as claimed hereinafter.

I claim:

1. A signal device comprising a housing, a series of indicators mounted one behind the other in the housing, a series of independently operated levers operatively connected to the respective indicators for moving the same out of the housing into display position, said connections including means for returning the indicators to the housing, a separate holding latch for each lever, means for initially placing the latch in release position when the lever is operated, and a connection between the several latches to obtain a simultaneous release thereof when either lever is operated.

2. A signal device comprising a housing, a series of indicators mounted one behind the other in the housing, a series of independently operated levers operatively connected to the respective indicators for moving the same out of the housing into display position, said connections including means for returning the indicators to the housing, a separate holding latch for each lever, said latch having an incline, a member on the lever engageable with the incline for initially placing the latch in release position when the lever is operated, and a connection between the several latches to obtain a simultaneous release thereof when either lever is operated.

3. A signal device comprising a series of indicators movable into and out of display position, a series of independently operated levers operatively connected to the respective indicators, said connections including means for moving the indicators out of display position, a separate holding latch for each lever, means for initially placing the latch in release position when the lever is operated, and a connection between the several latches to obtain a simultaneous release thereof when any lever is operated.

4. A signal device comprising a series of indicators movable into and out of display position, a series of independently operated levers operatively connected to the respective indicators, said connections including means for moving the indicators out of display position, a separate holding latch for each lever, said latch having an incline, a member on the lever engageable with the incline for initially placing the latch in release position when the lever is operated, and a connection between the several latches to obtain a simultaneous release thereof when any lever is operated.

In testimony whereof I affix my signature in presence of two witnesses.

JOSEPH V. POTTER.

Witnesses:
 ELMER PILLARD,
 JOHN W. BOSSHART.

Copies of this patent may be obtained for five cents each, by addressing the "Commissioner of Patents, Washington, D. C."